United States Patent
Mnasri et al.

(10) Patent No.: US 10,396,936 B1
(45) Date of Patent: Aug. 27, 2019

(54) SPATIALLY-DISTRIBUTED MULTI-INPUT INTERFEROMETER RECEIVER FOR 5G BACKHAULING SYSTEMS AND BEYOND

(71) Applicants: Bilel Mnasri, Montreal (CA); Ke Wu, Montreal (CA); Tarek Djerafi, Verdun (CA); Serioja Ovidiu Tatu, Montreal (CA)

(72) Inventors: Bilel Mnasri, Montreal (CA); Ke Wu, Montreal (CA); Tarek Djerafi, Verdun (CA); Serioja Ovidiu Tatu, Montreal (CA)

(73) Assignee: HUAWEI TECHNOLOGIES CANADA CO., LTD., Kanata (CA)

( * ) Notice: Subject to any disclaimer, the term of this patent is extended or adjusted under 35 U.S.C. 154(b) by 0 days.

(21) Appl. No.: 16/024,210

(22) Filed: Jun. 29, 2018

(51) Int. Cl.
*H04B 7/04* (2017.01)
*H04L 1/00* (2006.01)
*H04L 27/22* (2006.01)
*H04L 5/00* (2006.01)
*H04B 1/7097* (2011.01)

(52) U.S. Cl.
CPC ......... *H04L 1/0045* (2013.01); *H04B 1/7097* (2013.01); *H04B 7/04* (2013.01); *H04L 5/0048* (2013.01); *H04L 27/22* (2013.01)

(58) Field of Classification Search
CPC ..... H04L 1/0045; H04L 5/0048; H04L 27/22; H04B 1/7097; H04B 7/04
See application file for complete search history.

(56) References Cited

U.S. PATENT DOCUMENTS

| | | | | |
|---|---|---|---|---|
| 2007/0205955 A1* | 9/2007 | Korisch | ................. | H01Q 1/246 343/853 |
| 2009/0073054 A1* | 3/2009 | Yoon | .................... | H01Q 1/2216 343/700 MS |
| 2015/0311987 A1* | 10/2015 | Meyer | ...................... | H04B 1/03 340/657 |

OTHER PUBLICATIONS

T. S. Rappaport et al., "Millimeter Wave Mobile Communications for 5G Cellular: It Will Work!", IEEE Access, vol. 1, pp. 335-349, Mar. 2013.
S. Rangan et al., "Millimeter-Wave Cellular Wireless Networks: Potentials and Challenges", Proceedings of the IEEE, vol. 102, No. 3, pp. 366-385, Mar. 2014.
C.-X. Wang et al., "Cellular Architecture and Key Technologies for 5G Wireless Communication Networks", IEEE Communications Magazine, vol. 52, No. 2, pp. 122-130, Feb. 2014.
U. Siddique et al., "Wireless Backhauling of 5G Small Cells: Challenges and Solution Approaches", IEEE Wireless Communications, vol. 22, No. 5, pp. 22-31, Oct. 2015.

(Continued)

*Primary Examiner* — Jaison Joseph (57) ABSTRACT

A receiver for receiving a radio frequency (RF) signal that comprises a carrier signal modulated with a baseband symbol. The receiver includes a plurality of spatially-distributed antennas to receive the RF signal; a local reference signal generator configured to generate a local reference signal; a plurality of power couplers, each power coupler having a first input connected to a respective one of the antennas to receive a respective version of the RF signal, a second input connected to the local reference signal generator to receive the local reference signal, and an output to output a corresponding coupled signal; and a differentiator circuit connected to the power coupler outputs for determining a power differential between at least one pair of the coupled signals to recover the baseband symbol from the RF signal.

20 Claims, 7 Drawing Sheets

(56) References Cited

OTHER PUBLICATIONS

G. S. Shiroma et al., "A High-Directivity Combined Self-Beam/Null-Steering Array for Secure Point-to-Point Communications", IEEE Transactions on Microwave Theory and Techniques, vol. 55, No. 5, pp. 838-844, May 2007.

F. F. He et al., "Low-Cost 60-GHz Smart Antenna Receiver Subsystem Based on Substrate Integrated Waveguide Technology", IEEE Transactions on Microwave Theory and Techniques, vol. 60, No. 4, pp. 1156-1165, Apr. 2012.

Z. He et al., "A Hardware Efficient Implementation of a Digital Baseband Receiver for High-Capacity Millimeter-Wave Radios", IEEE Transactions on Microwave Theory and Techniques, vol. 63, No. 5, pp. 1683-1692, May 2015.

J. Li et al., "A Six-Port Direct Digital Millimeter Wave Receiver," Proceedings of IEEE National Telesystems Conference, San Diego, CA, USA, pp. 79-82, May 1994.

S. O. Tatu et al., "Multiport Technology: The New Rise of an Old Concept", IEEE Microwave Magazine, vol. 15, pp. S34-S44, ISSN 1527-3342, 2014.

J. Osth et al., "Six-Port Gigabit Demodulator", IEEE Transactions on Microwave Theory and Techniques, vol. 59, No. 1, pp. 125-131, Jan. 2011.

A. Hasan et al., "Novel Modeling and Calibration Approach for Multi-Port Receivers Mitigating System Imperfections and Hardware Impairments", IEEE Transactions on Microwave Theory and Techniques, vol. 60, No. 8, pp. 2644-2653, Aug. 2012.

C. Hannachi et al., "V-band Six-port Quadrature Demodulator: Error Vector Magnitude Analysis", 8th Global Symposium on Millimeter-Waves (GSMM 2015), pp. 25-27, May 2015.

K. Haddadi et al., "Four-Port Communication Receiver with Digital IQ-Regeneration", IEEE Microwave and Wireless Components Letters, vol. 20, No. 1, pp. 58-60, Jan. 2010.

C. de la Morena-Álvarez Palencia et al., "Four-Octave Six-Port Receiver and Its Calibration for Broadband Communications and Software Defined Radios", Progress in Electromagnetics Research, vol. 116, pp. 1-21, 2011.

E. Moldovan et al., "A 60 GHz Multi-port Receiver with Analog Carrier Recovery for Ultra Wideband Wireless Personal Area Networks", 2008 European Conference on Wireless Technology, pp. 358-361, Oct. 2008.

E. Moldovan et al., "Design and Characterization of Novel W-band Wide-band Couplers and Six-port Circuit", Proceedings of the 45th European Microwave Conference, pp. 279-282, Sep. 2015.

S. O. Tatu et al., "New Millimeter-wave Six-port Heterodyne Receiver Architecture", 2006 IEEE MTT-S International Microwave Symposium Digest, pp. 1999-2002, Jun. 2006.

S. O. Tatu et al., "Ka-Band Analog Front-End for Software-Defined Direct Conversion Receiver", IEEE Transactions on Microwave Theory and Techniques, vol. 53, No. 9, pp. 2768-2776, Sep. 2005.

M. D. McKinley et al., "EVM Calculation for Broadband Modulated Signals," Proceedings of the 64th ARFTG Conf. Dig., pp. 45-52, Dec. 2004.

https://www.minicircuits.com/pdfs/ZX47-55+.pdf.

C. Mittermayer et al., "On the Determination of Dynamic Errors for Rise Time Measurement with an Oscilloscope", IEEE Transactions on Instrumentation and Measurement, vol. 48, No. 6, pp. 1103-1107, Dec. 1999.

* cited by examiner

SPATIALLY-DISTRIBUTED MULTI-INPUT INTERFEROMETER RECEIVER FOR 5G BACKHAULING SYSTEMS AND BEYOND

FIELD

Example embodiments relate generally to radio frequency receivers, and in particular spatially-distributed multi-input direct conversion receivers.

BACKGROUND

As a result of the exponential growth of data traffic that is facing today's 3G and 4G operators, international regulatory agencies like the Federal Communications Commission (FCC) and the International Telecommunications Union (ITU) have been urged to create special focus groups such as IMT-2020 in order to establish the technical recommendations and general guidelines to be adopted through the fifth generation (5G) of wireless systems.

Emerging wireless communications standards support the transmission of data rates in the order of multiple Gb/s with a latency of less than 1 millisecond.

The challenging requirements and technical specifications for better performances in 5G systems will require a complete overhaul of existing network architectures.

In order to avoid the cost of fiber optic interconnectivities, it is typically desirable to wirelessly implement fast and point-to-point communications of the backhauling system.

It is also desirable to reduce the energy consumption, the digital signal processing requirements and the cost per unit of access points within a wireless backhauling system to support large-scale deployment and easy penetration of the emerging 5G technology into the market.

Six-port direct conversion receivers have shown promising capabilities since their introduction. Six-port receiver architecture has relatively low costs and a compact size which enables high data rates while requiring less power than conventional heterodyne receivers.

A typical conventional six-port interferometer circuit passes a modulated RF signal through two couplers before being read by a power detector at one of the output ports. Due to the nature of this interferometric scheme, the dynamic range of a typical six-port receiver typically suffers from at least 6 dB loss even when the losses within the circuit substrate are neglected.

Additionally, as operating frequency increases, the losses of six-port receivers also increase, as demonstrated when six-port receivers are operated at the $K_a$ or E-bands of the electromagnetic spectrum. Such losses reduce the dynamic range of the whole receiver and create requirements for the gain of antennas and power amplifiers.

SUMMARY

A spatially-distributed multi-input interferometry based receiver is disclosed. In example embodiments, the receiver is configured to process multiple phased versions of a received radio frequency signal, and directly recover baseband symbols from the received radio frequency signal based on differences between the phased versions without requiring frequency down conversion. In example embodiments the receiver is implemented using basic low-power components and the different versions of the received radio frequency signal each pass through only a single power coupler before being provided to a power detector, thereby mitigating power loss through the receiver architecture.

According to a first example aspect, a receiver is disclosed for receiving a radio frequency (RF) signal that comprises a carrier signal modulated with a baseband symbol. The receiver includes: a plurality of spatially-distributed antennas to receive the RF signal; a local reference signal generator configured to generate a local reference signal; a plurality of power couplers, each power coupler having a first input connected to a respective one of the antennas to receive a respective version of the RF signal, a second input connected to the local reference signal generator to receive the local reference signal, and an output to output a corresponding coupled signal; and a differentiator circuit connected to the power coupler outputs for determining a power differential between at least one pair of the coupled signals to recover the baseband symbol from the RF signal.

In accordance with example embodiments of the first aspect, the plurality of spatially-distributed antennas includes a first, second, third and fourth antenna, the plurality of power couplers includes: a first power coupler having the first input thereof connected to the first antenna to receive a first phased version of the RF signal and the second input thereof connected to the local reference signal generator to receive the local reference signal, the output of the first power coupler outputting a first coupled signal; a second power coupler having the first input thereof connected to the second antenna to receive a second phased version of the RF signal and the second input thereof connected to the local reference signal generator to receive the local reference signal, the output of the second power coupler outputting a second coupled signal; a third power coupler having the first input thereof connected to the third antenna to receive a third phased version of the RF signal and the second input thereof connected to the local reference signal generator to receive the local reference signal, the output of the third power coupler outputting a third coupled signal; and a fourth power coupler having the first input thereof connected to the fourth antenna to receive a fourth phased version of the RF signal and the second input thereof connected to the local reference signal generator to receive the local reference signal, the output of the fourth power coupler outputting a fourth coupled signal; wherein the differentiator circuit is configured to determine a first power differential between the first and third coupled signals that represents an in-phase component of the baseband symbol and a second power differential between the second and fourth coupled signals that represents a quadrature component of the baseband symbol.

In accordance with example embodiments, the local reference signal generator is configured to generate the local reference signal to have a frequency and a phase that matches an operating frequency and a phase of the carrier signal.

In accordance with example embodiments, the local reference signal generator comprises a local oscillator that generates a base reference signal to match an operating frequency of the carrier signal, and a phase shifter that adjusts a phase of the base reference signal to match the unmodulated phase of the carrier signal.

In accordance with example embodiments, the local reference signal generator comprises a first power divider at an output of the phase shifter to output two copies of the local reference signal, and a second and third power divider each connected to the first power divider to receive a respective one of the two copies of the local reference signal, the second and third power dividers each providing copies of the local reference signal to the second inputs of a respective two of the power couplers such that each of the power couplers simultaneously receives the local reference signal.

In accordance with example embodiments, the second phased version of the RF signal has a phase difference of approximately 90° from the first phased version of the RF signal, the third phased version of the RF signal has a phase difference of approximately 180° from the first phased version of the RF signal, and the fourth phased version of the RF signal has a phase difference of approximately 270° from the first phased version of the RF signal.

In accordance with example embodiments, the antennas are arranged in a linear array with a constant inter-antenna distance between adjacent antennas that is equal to or greater than one quarter of an operating frequency wavelength of the carrier signal.

In accordance with example embodiments, the antennas are in a fixed positioned relative to the transmitter such that the RF signal is received within plus or minus 11° of a target angle for which a phase difference between the versions of the RF signal from any two adjacent antennas is 90°.

In accordance with example embodiments, the target angle is equal to:

$$\cos^{-1}\left(\frac{\lambda_0}{4d}\right),$$

where $\lambda_0$ is the operating frequency wavelength of the carrier signal; and d is the inter-antenna distance.

In accordance with example embodiments of the first aspect, the receiver comprises: a first delay line between the first input of the first power coupler and the first antenna, a second delay line between the first input of the second power coupler and the second antenna, a third delay line between the first input of the third power coupler and the third antenna, and a fourth delay line between the first input of the fourth power coupler and the fourth antenna, the delay lines being configured so that the second phased version of the RF signal has a phase difference of approximately 90° from the first phased version of the RF signal, the third phased version of the RF signal has a phase difference of approximately 180° from the first phased version of the RF signal, and the fourth phased version of the RF signal has a phase difference of approximately 270° from the first phased version of the RF signal.

In accordance with example embodiments of the first aspect, the differentiator circuit comprises: a first power detector connected to the first power coupler to receive the first coupled signal and output a first voltage signal representing a power of the first coupled signal; a second power detector connected to the second power coupler to receive the second coupled signal and output a second voltage signal representing a power of the second coupled signal; a third power detector connected to the third power coupler to receive the third coupled signal and output a third voltage signal representing a power of the third coupled signal; a fourth power detector connected to the fourth power coupler to receive the fourth coupled signal and output a fourth voltage signal representing a power of the fourth coupled signal; a first differential op-amp having first and second inputs connected to the first and third power detectors to receive the first and third voltage signals, respectively, and output a voltage representing the first power differential; and a second differential op-amp having first and second inputs connected to the second and fourth power detectors to receive the second and fourth voltage signals, respectively, and output a voltage representing the second power differential.

In accordance with example embodiments, the receiver comprises respective sample and hold circuits at outputs of the first differential op-amp and the second differential op-amp for sampling the voltages output thereby, the sample and hold circuits each operating at a sampling rate that is approximately double a symbol rate used to modulate the baseband symbols at the transmitter.

In accordance with example embodiments of a second aspect, a method at a receiver is disclosed for receiving a radio frequency (RF) signal that comprises a carrier signal modulated with a baseband symbol. The method includes: receiving the RF signal simultaneously at each one of a plurality of spatially-distributed antennas; coupling the RF signal received at each of the plurality of antennas with a local reference signal to output a corresponding coupled signal; and determining a power differential between at least one pair of the coupled signals to recover the baseband symbol from the RF signal.

In accordance with example embodiments, receiving the RF signal simultaneously at each one of a plurality of spatially-distributed antennas comprises receiving the RF signal at each of a first, second, third and fourth antenna, and coupling the RF signal received at each of the plurality of antennas includes: coupling a first phased version of the RF signal from the first antenna with the local reference signal to output a first coupled signal; coupling a second phased version of the RF signal from the second antenna with the local reference signal to output a second coupled signal; coupling a third phased version of the RF signal from the third antenna with the local reference signal to output a third coupled signal; and coupling a fourth phased version of the RF signal from the fourth antenna with the local reference signal to output a fourth coupled signal, and determining a power differential between at least one pair of the coupled signals comprises determining a first power differential between the first and third coupled signals that represents an in-phase component of the baseband symbol and a second power differential between the second and fourth coupled signals that represents a quadrature component of the baseband symbol.

In accordance with example embodiments, the method for receiving a radio frequency (RF) signal that comprises a carrier signal modulated with a baseband symbol comprises generating the local reference signal with a frequency and a phase that matches an operating frequency and a phase of the carrier signal.

In accordance with example embodiments, generating the local reference signal comprises dividing a generated reference signal into two local reference signals that are then each divided into two further local reference signals that are each coupled in simultaneous phase with a respective one of the phased versions of the RF signal.

In accordance with example embodiments, the second phased version of the RF signal has a phase difference of approximately 90° from the first phased version of the RF signal, the third phased version of the RF signal has a phase difference of approximately 180° from the first phased version of the RF signal, and the fourth phased version of the RF signal has a phase difference of approximately 270° from the first phased version of the RF signal.

In accordance with example embodiments, the method for receiving a radio frequency (RF) signal that comprises a carrier signal modulated with a baseband symbol comprises a step of locating the antennas in a fixed positioned relative to the transmitter such that the RF signal is received within plus or minus 11° of a target angle for which a phase difference between the versions of the RF signal from any two adjacent antennas is 90°.

In accordance with example embodiments, the method for receiving a radio frequency (RF) signal that comprises a carrier signal modulated with a baseband symbol comprises, prior to coupling the RF signal received at each of the plurality of antennas with the local reference signal: applying a first delay to the RF signal from the first antenna to produce the first phased version of the RF signal for coupling with the local reference signal, applying a second delay to the RF signal from the second antenna to produce the second phased version of the RF signal for coupling with the local reference signal, applying a third delay to the RF signal from the third antenna to produce the third phased version of the RF signal for coupling with the local reference signal, applying a fourth delay to the RF signal from the fourth antenna to produce the fourth phased version of the RF signal for coupling with the local reference signal, the delays being applied so that the second phased version of the RF signal has a phase difference of approximately 90° from the first phased version of the RF signal, the third phased version of the RF signal has a phase difference of approximately 180° from the first phased version of the RF signal, and the fourth phased version of the RF signal has a phase difference of approximately 270° from the first phased version of the RF signal.

In accordance with example embodiments, determining the first power differential between the first and third coupled signals comprises: outputting from a first power detector a first voltage signal representing a power of the first coupled signal; and outputting from a third power detector a third voltage signal representing a power of the third coupled signal; the first power differential being a difference between the first voltage signal and the second voltage signal, and determining the second power differential between the second and fourth coupled signals comprises: outputting from a second power detector a second voltage signal representing a power of the second coupled signal; and outputting from a fourth power detector a fourth voltage signal representing a power of the fourth coupled signal; the second power differential being a difference between the second voltage signal and the fourth voltage signal.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

Figure 1:
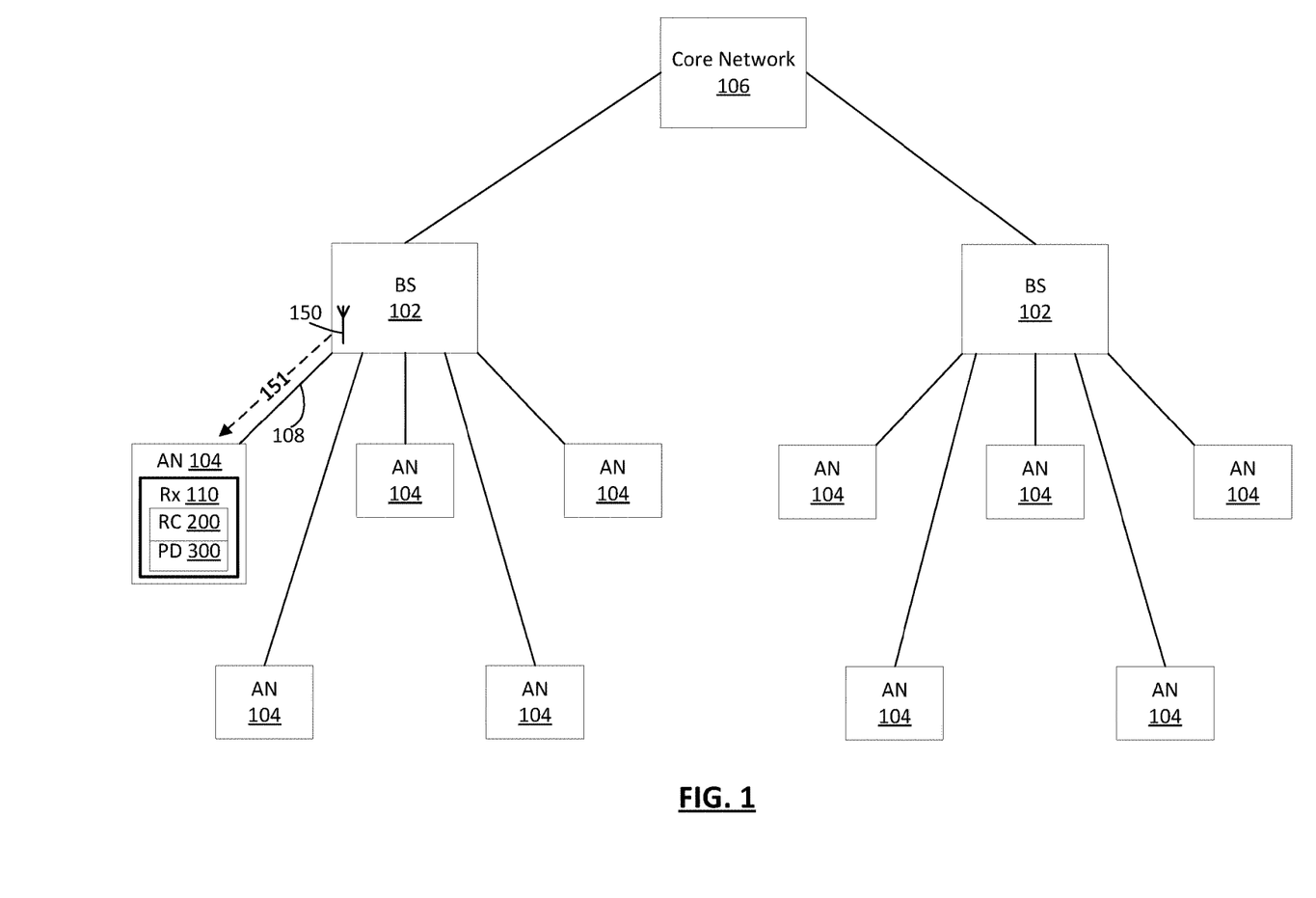
FIG. 1 is a block diagram of an ultra dense network in which example embodiments of a spatially-distributed multi-input interferometry based receiver disclosed herein may be applied.

An example of a network architecture for use in 5G systems is the Ultra Dense Network (UDN) architecture. An example of a UDN architecture is shown in FIG. 1. UDNs involve the deployment of multiple base stations (BS) 102 and access nodes (AN) 104 within the same area to get as close as possible to the end user station or device. The access nodes 104 communicate with the base stations 102 which in turn communicate with a core network 106 (which may be operated by a service provider, for example).

In at least some UDNs, the communication links between the core network 106 and base stations 102 may be implemented using fiber connections and the communication links between the base stations 102 and the access nodes 104 may be implemented using wireless communications links, which may for example be fixed wireless communications links 108. In accordance with example embodiments, one or more spatially-distributed multi-input interferometry based receivers 110 are used to implement wireless communications across a fixed wireless access communications link 108 between an access node 104 and a base station 102. Spatial interferometry based receivers 110 may, by way of example, be implemented at one or both of base stations 102 and access nodes 104 to receive wireless signals sent using communications link 108. In FIG. 1, an example of a spatial interferometry based receiver ($R_x$) 110 is shown at a representative access node 104 for receiving a modulated radio frequency (RF) signal 151 transmitted from a base station transmitter 150 across corresponding fixed wireless access communications link 108. The spatial interferometry based receiver 110 includes a radio frequency (RF) receiver circuit (RC) 200 and a power differentiator (PD) circuit 300.

The transmitter 150 is configured to modulate baseband symbols onto a carrier signal to generate modulated RF signal 151. In example embodiments the baseband symbols are digital values encoded using phase/amplitude coding techniques in which digital vales are represented as constellation points identified by one or both of in-phase and quadrature components. For example, baseband symbols could be encoded using binary phase shift keying (BPSK), quadrature phase shift keying (QPSK), and other levels of quadrature amplitude modulation (QAM) such as 16-QAM, 32-QAM, 64-QAM, 128-QAM etc. The carrier signal onto which the BPSK, QPSK or QAM symbols are modulated may for example have an operating frequency within the bands proposed for fixed wireless 5G, including for example millimeter wave bands within 24-86 GHz. In different example configurations the carrier signal operating frequency could also fall within other bands, including by way of non-limiting example bands within 600 MHz to 6 GHz.

As will be described below, spatial interferometry based receiver 110 is configured to recover the baseband symbols from the modulated RF signal 151 received at antennas of the receiver 110 without the use of heterodyne circuits for frequency down-conversion.

Figure 2:
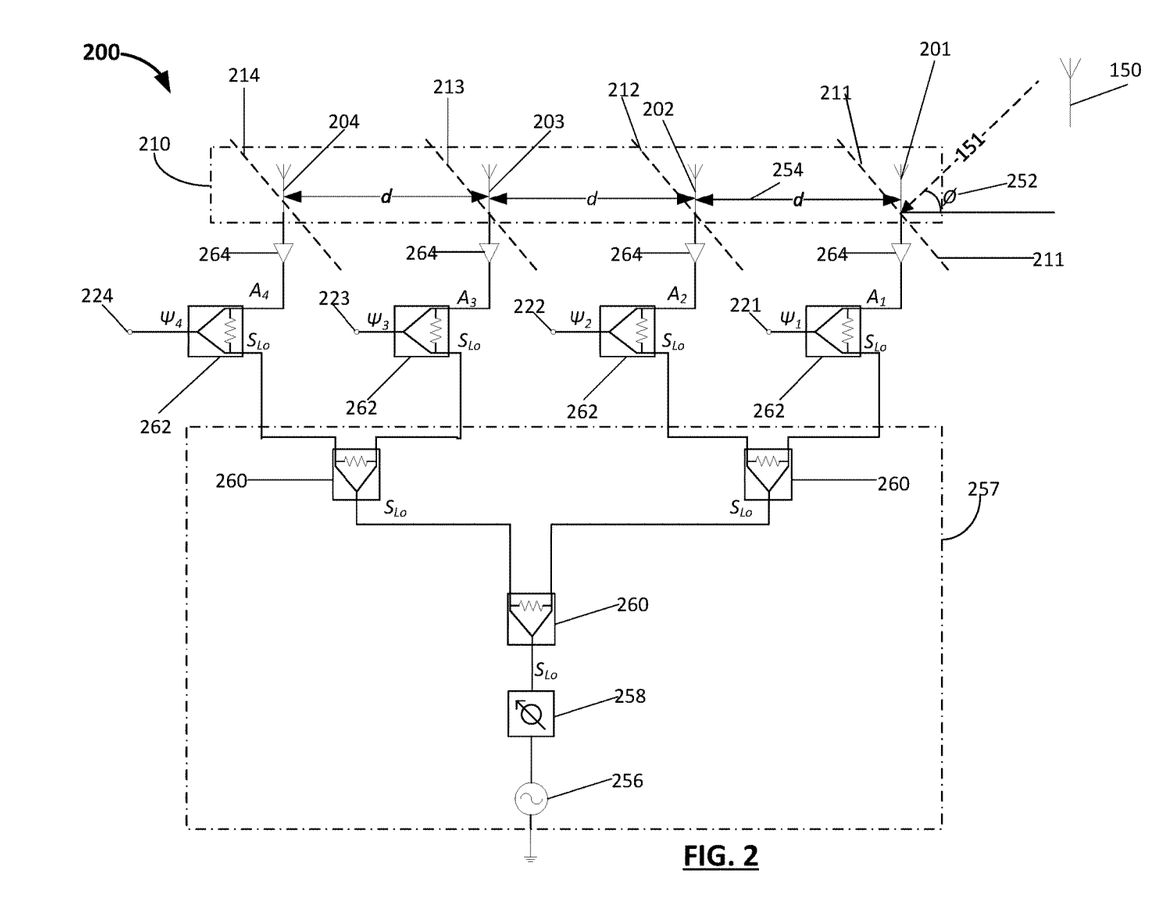
FIG. 2 is a schematic of a receiver circuit that is part of a spatially-distributed multi-input interferometry based receiver in a node of the network of FIG. 1, in accordance with example embodiments.

FIG. 2 provides a schematic of the RF receiver circuit 200 of receiver 110 in accordance with an example embodiment. The receiver circuit 200 comprises a uniform linear array 210 of four spatially-distributed, wave-correlated antennas 201, 202, 203, and 204 with a constant inter-antenna distance d 254 between adjacent antennas. Each of the antennas 201, 202, 203 and 204 is connected through a respective low noise amplifier (LNA) 264 to a respective power coupler 262. During operation, each antenna 201, 202, 203 and 204 will receive a phased version 211, 212, 213 and 214, respectively, of the modulated RF signal 151 sent by transmitter 150. Each of the phased versions 211, 212, 213, and 214 of the modulated RF signal 151 is passed through a respective LNA 264 resulting in a respective amplified phased version (shown as $A_1$, $A_2$, $A_3$ and $A_4$ in FIG. 2) that is provided to an input of a respective power coupler 262. In example embodiments the receiver circuit 200 has a symmetrical architecture in that each of the antennas 201 to 204 are identical, each of the LNAs 264 are identical, each of the power couplers 262 are identical, each of the conductors connecting the respective antennas to the LNAs 264 are the identical length and each of the conductors connecting the LNAs 264 to the respective power couplers 262 are the identical length. This symmetry ensures that the respective phased versions of the RF signal 151 from the different antennas 201 to 204 are all processed simultaneously through the receiver circuit 200 without any asymmetrical phase distortion or amplitude distortion to the respective phased versions within the receiver circuit 200. As used herein, "identical" can include components that fall within operationally acceptable manufacturing tolerance ranges for RF receiver equipment.

The receiver circuit 200 also includes a reference signal generator 257, comprising a local oscillator (LO) 256, a phase shifter 258, and power dividers 260. As illustrated in FIG. 2, LO 256 generates a base reference signal that matches the operating frequency of the carrier signal used for the RF signal 151. The base reference signal is phase shifted at phase shifter 258 to produce local reference signal ($S_{LO}$) that has a phase that matches that of the unmodulated carrier signal used to generate modulate RF signal 151. The local reference signal $S_{LO}$ is then passed through two levels of power dividers 260 to produce four simultaneous and identical copies of the reference signal $S_{LO}$. A respective copy of the reference signal $S_{LO}$ is supplied in common phase to each of the four power couplers 262. Although different RF-signal power coupler and power divider circuits can be used, in at least some example embodiments the power couplers 262 are Wilkinson power couplers and the power dividers 260 are Wilkinson power dividers.

At each of the power couplers 262, the LO 256 reference signal $S_{LO}$ is combined with a respective one of the amplified phased versions $A_1$, $A_2$, $A_3$ and $A_4$ of the received RF signal 151 to generate coupled signals $\Psi_1$, $\Psi_2$, $\Psi_3$, and $\Psi_4$, at power coupler outputs 221, 222, 223, and 224, respectively. In example embodiments, the power couplers 262 each apply an equal power coupling ratio with no phase shift.

In the receiver circuit 200 of FIG. 2, a phase difference $\beta$ between received signals at any two consecutive antennas is a function of the angle of arrival $\phi$ 252, the inter-element distance d 254, and a wavelength $\lambda_0$ relative to the operating frequency of the system. The phase difference $\beta$ can be expressed as:

$$\beta = \frac{2\pi d \cos(\phi)}{\lambda_0}$$

By way of example, the reference signal $S_{LO}$ can be defined as:

$$S_{LO} = a \cdot \exp(j\theta_O)$$

where a is an amplitude and $\theta_O$ is a phase of the reference signal $S_{LO}$. The amplified phased version $A_1$ of the modulated RF signal 151 as received through the first antenna 201 can be defined as:

$$A_1 = \alpha \cdot a \cdot \exp(j\theta_i)$$

where $\alpha$ is a ratio between $A_1$ and the reference signal $S_{LO}$ and $\theta_i$ is a phase of $A_1$.

The remaining amplified phased versions $A_2$, $A_3$ and $A_4$ of the modulated RF signal 151 as received through antennas 202, 203 and 204, respectively, can be expressed as:

$$A_2 = A_1 \cdot \exp(-j\beta)$$

$$A_3 = A_1 \cdot \exp(-2j\beta)$$

$$A_4 = A_1 \cdot \exp(-3j\beta)$$

In accordance with example embodiments, the angle of arrival $\phi$ 252 is fixed to make the phase difference $\beta$ equal to $\pi/2$ or 90°, such that the four coupled signals ($\Psi_1$, $\Psi_2$, $\Psi_3$, and $\Psi_4$, shown in FIG. 2) at the power coupler outputs 221, 222, 223 and 224 can be expressed, respectively, as:

$$\psi_1 = \frac{A_1}{\sqrt{2}} + \frac{S_{LO}}{2\sqrt{2}}$$
$$= \frac{a \cdot \exp(j\theta_0)}{\sqrt{2}} \cdot \left(\frac{1}{2} + \alpha \cdot \exp(j\Delta\theta)\right)$$

$$\psi_2 = \frac{A_1 \exp\left(-\frac{j\pi}{2}\right)}{\sqrt{2}} + \frac{S_{LO}}{2\sqrt{2}}$$
$$= \frac{a \cdot \exp(j\theta_0)}{\sqrt{2}} \cdot \left(\frac{1}{2} + \alpha \cdot \exp\left(j\left(\Delta\theta - \frac{\pi}{2}\right)\right)\right)$$

$$\psi_3 = \frac{A_1 \exp(-j\pi)}{\sqrt{2}} + \frac{S_{LO}}{2\sqrt{2}}$$
$$= \frac{a \cdot \exp(j\theta_0)}{\sqrt{2}} \cdot \left(\frac{1}{2} + \alpha \cdot \exp(j(\Delta\theta - \pi))\right)$$

$$\psi_4 = \frac{A_1 \exp\left(-j\frac{3\pi}{2}\right)}{\sqrt{2}} + \frac{S_{LO}}{2\sqrt{2}}$$
$$= \frac{a \cdot \exp(j\theta_0)}{\sqrt{2}} \cdot \left(\frac{1}{2} + \alpha \cdot \exp\left(j\left(\Delta\theta - \frac{3\pi}{2}\right)\right)\right)$$

where $\Delta\theta$ refers to a phase difference between the reference signal $S_{LO}$ and $A_1$:

$$\Delta\theta = \theta_i - \theta_0$$

Figure 3:
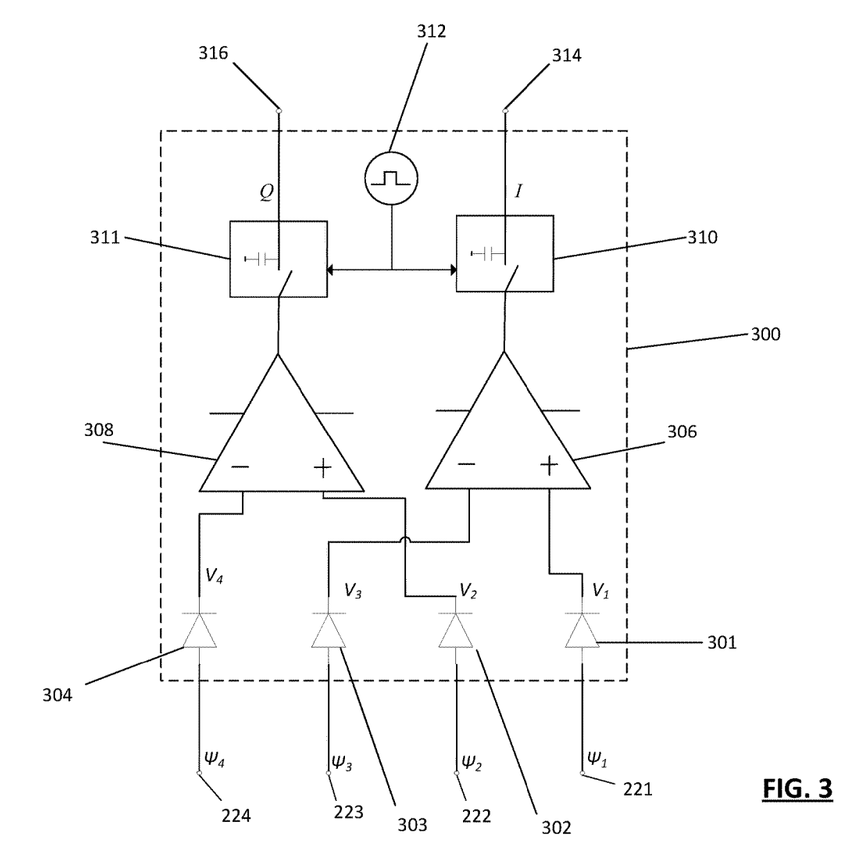
FIG. 3 is a schematic of a signal power differentiator circuit of the spatial interferometry based receiver in accordance with example embodiments.

As shown in FIG. 3, in accordance with example embodiments, the couple signals $\Psi_1$, $\Psi_2$, $\Psi_3$, and $\Psi_4$ at power coupler outputs 221, 222, 223, and 224 are provided to power differentiator circuit 300. Power differentiator circuit 300 includes four power detectors 301, 302, 303, and 304 that are attached to respective power coupler outputs 221, 222, 223, and 224 in order to obtain baseband voltages $V_1$, $V_2$, $V_3$, and $V_4$ proportional to the power of the coupled signals $\Psi_1$, $\Psi_2$, $\Psi_3$, and $\Psi_4$. In at least some example embodiments the power detectors 301, 302, 303 and 304 are low power Schottky diode-based power detectors that operate under their square regions to convert the coupled signals received at their inputs to voltages. By way of non-limiting example, an example of a possible power detector for frequencies up to 8 GHz is the Mini-Circuits™ ZX47-55S+.

The DC output voltage of an ideal power detector is proportional to the square magnitude of the signal at its input:

$$V_i = K_i |\Psi_i|^2, \; i=1,2,3,4$$

where K is a constant measured in V/W.

Treating the four power detectors 301, 302, 303, 304 as ideal power detectors that have the same K constant, the DC output voltages for power detectors 301, 302, 303, and 304 attached to power detector inputs 221, 222, 223, and 224 can be expressed as:

$$V_1 = \frac{K \cdot a^2}{2}\left(\frac{1}{4} + \alpha^2 + \alpha \cdot \cos(\Delta\theta)\right)$$

$$V_2 = \frac{K \cdot a^2}{2}\left(\frac{1}{4} + \alpha^2 + \alpha \cdot \sin(\Delta\theta)\right)$$

$$V_3 = \frac{K \cdot a^2}{2}\left(\frac{1}{4} + \alpha^2 - \alpha \cdot \cos(\Delta\theta)\right)$$

$$V_2 = \frac{K \cdot a^2}{2}\left(\frac{1}{4} + \alpha^2 - \alpha \cdot \sin(\Delta\theta)\right)$$

Using these voltages, a complex vector $\Gamma$ can be expressed as:

$$\Gamma = I + jQ = (V_1 - V_3) + j(V_2 - V_4) = \alpha \cdot K \cdot a^2 \cdot \exp(j\Delta\theta)$$

The magnitude of the complex vector $\Gamma$ is proportional to the ratio $\alpha$ between $A_1$ and reference signal $S_{LO}$. In accordance with example embodiments, at a configuration stage the phase shifter 258 is configured to apply an adjustment to the phase $\theta_0$ of reference signal $S_{LO}$ in order to make $\theta_0$ equal to zero, meaning the phase $\theta_0$ of reference signal $S_{LO}$ matches the phase of an unmodulated carrier signal from the transmitter 150, with the result that complex vector $\Gamma$ represents the baseband symbol modulated onto the carrier wave signal by transmitter 150:

$$\Gamma = \alpha \cdot K \cdot a^2 \cdot \exp(j\theta_i)$$

As shown in FIG. 3, in the illustrated example, the signal power differentiator 300 includes first and second operational amplifiers 306 and 308. DC output voltages $V_1$ and $V_3$, corresponding to the voltage output from power detectors 301 and 303, are connected to the non-inverting and the inverting input of first operational amplifier 306. In particular, the output voltage $V_1$ from power detector 301 is attached to the non-inverting input and the output voltage $V_3$ from power detector 303 is attached to the inverting input of the first operational amplifier 306. The output of the first operational amplifier 306 is proportional to the difference between the output voltages of power detectors 301 and 303.

Similarly, DC output voltages $V_2$ and $V_4$, corresponding to the voltage output from power detectors 302 and 304 are connected to the non-inverting and the inverting input of second operational amplifier 308. The output voltage $V_2$ from power detector 302 is attached to the non-inverting input and the output voltage $V_4$ from power detector 304 is attached to the inverting input of the second operational amplifier 308. The output of operational amplifier 308 is proportional to the difference between the output voltages of power detectors 302 and 304.

In accordance with example embodiments, the signal demodulator 300 includes first and second sample and hold circuits 310, 311 in combination with a clock 312 for sampling the respective outputs of first and second operational amplifiers 306 and 308 to obtain a demodulation constellation without the transition between consecutive states. In accordance with example embodiments, the clock 312 is operated at double the symbol rate that was used to encode the baseband symbols at the transmitter.

In accordance with example embodiments, an I output 314 from the first sample and hold circuit 310 connected to first operational amplifier 306 corresponds to:

$$I = V_1 - V_3 = \frac{K \cdot a^2}{2}\left(\frac{1}{4} + \alpha^2 + \alpha \cdot \cos(\Delta\theta)\right) - \frac{K \cdot a^2}{2}\left(\frac{1}{4} + \alpha^2 - \alpha \cdot \cos(\Delta\theta)\right)$$

I represents in-phase component of the RF modulated signal 151, which is the real part of complex vector $\Gamma$. A Q output 316 from the second sample and hold circuit 311 connected to second operational amplifier 308 corresponds to:

$$Q = V_2 - V_4 = \frac{K \cdot a^2}{2}\left(\frac{1}{4} + \alpha^2 + \alpha \cdot \sin(\Delta\theta)\right) - \frac{K \cdot a^2}{2}\left(\frac{1}{4} + \alpha^2 - \alpha \cdot \sin(\Delta\theta)\right)$$

Q represents the quadrature component of the RF modulated signal 151, which is the imaginary part of complex vector $\Gamma$. As a result of the differential nature of the signal power differentiator 300, there is no DC offset in the I output 314 or Q output 316.

Thus, the receiver 110 enables the baseband I and Q components of a digital symbol to be directly detected at the antenna RF signal level without requiring signal down-conversion and the associated high power consuming heterodyne or super heterodyne receiver architecture. The receiver 110 is able to decouple the I and Q components directly at the antenna RF signal level and thereby reduce the signal processing required at the receiver. In the illustrated example, the receiver 110 is implemented using inexpensive, low power consuming, components, and the phased RF signals from the respective antennas each pass through only a single power coupler before being provided to a power detector.

Figure 4A:
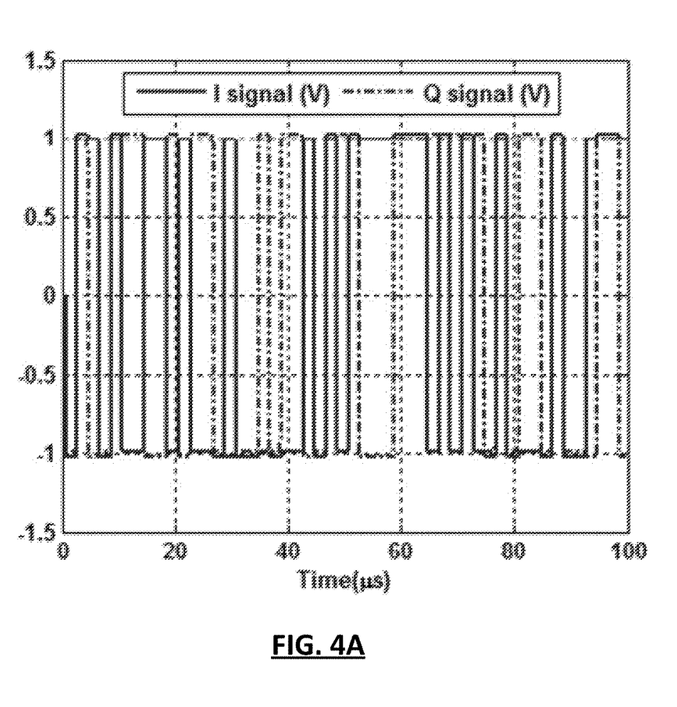
FIG. 4A illustrates I and Q signals at the outputs the of signal power differentiator circuit of FIG. 3 for a received quadrature phase shift keying (QPSK) encoded signal.
Figure 4B:
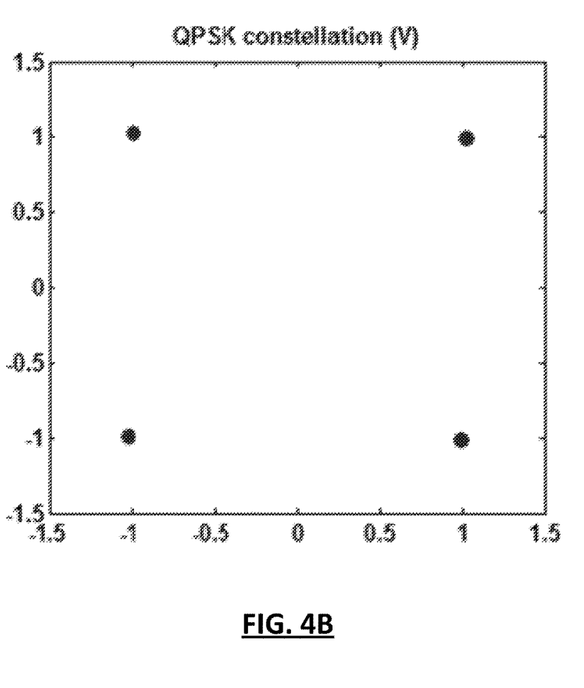
FIG. 4B illustrates the received QPSK constellation corresponding to the I and Q signals of FIG. 4A.

By way of illustration, FIG. 4A illustrate the I and Q signal components (represented at as voltages) at the outputs 214 and 316 for received quadrature phase shift keying (QPSK) encoded symbols over 100 microseconds, and FIG. 4B illustrates the corresponding recovered QPSK symbol constellation (without noise) over the same duration.

Figure 5A:
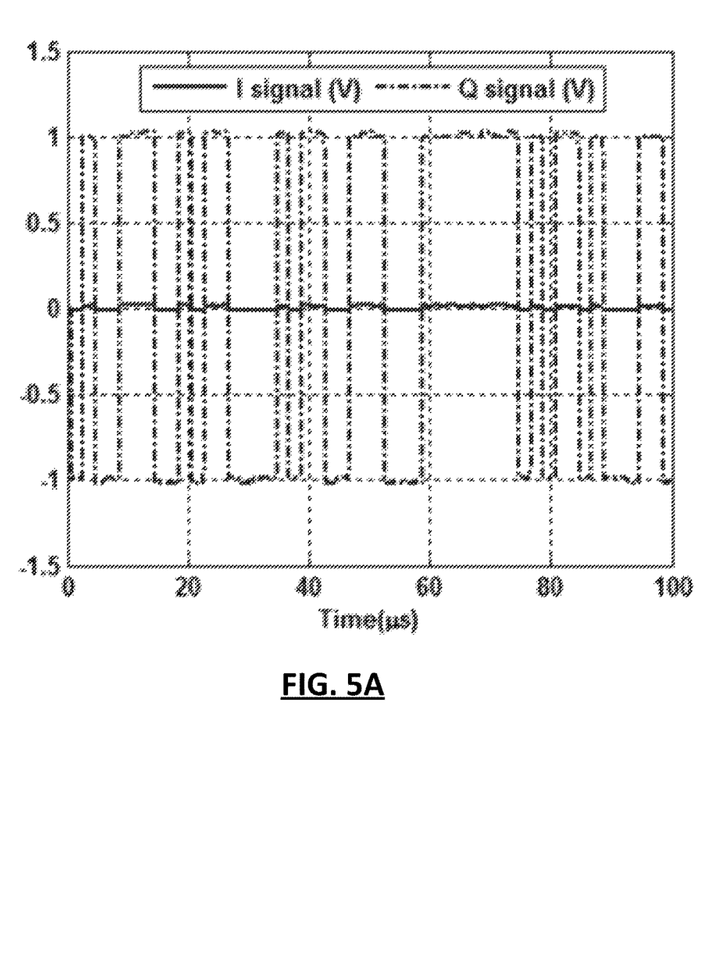
FIG. 5A illustrates I and Q signals at the outputs the of signal power differentiator circuit of FIG. 3 for a received binary phase shift keying (BPSK) encoded signal.
Figure 5B:
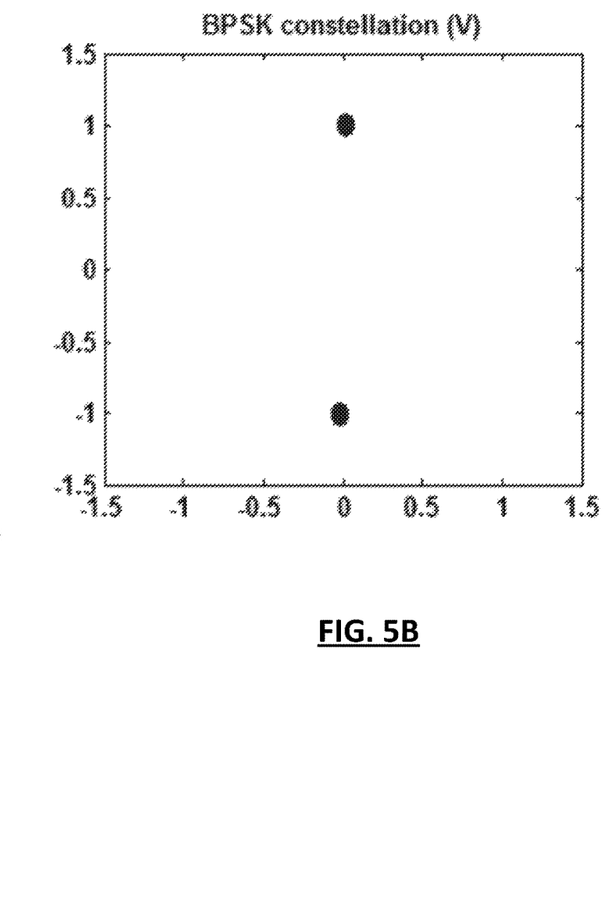
FIG. 5B illustrates the received BPSK constellation corresponding to the I and Q signals of FIG. 5A.

By way of further illustration, FIG. 5A illustrate the I and Q signal components (represented at as voltages) at the outputs 214 and 316 for received binary phase shift keying (BPSK) encoded symbols over 100 microseconds, and FIG. 5B illustrates the corresponding recovered BPSK symbol constellation (without noise) over the same duration. It will be noted that for a BPSK-only implementation the antenna array could be reduced two antennas with a 180 degree phase separation as the in-phase component I is irrelevant.

As noted above, in example embodiments, the inter-element distance d 254 of the uniform linear array 210 is selected so that the phase difference $\beta$ is $\pi/2$, or 90°, for a particular angle of arrival. Because the phase difference $\beta$ can be expressed as a function of the inter-element distance d 254, the wavelength $\lambda_0$ relative to the operating frequency of the system, and the angle of arrival $\phi$ 252, if it is known that the phase difference $\beta$ should be $\pi/2$, a target angle $\pi_{90}$, which corresponds to the angle of arrival $\phi$ 252 that makes the phase difference $\beta$ equal to $\pi/2$ (or 90°), can be calculated as:

$$\beta = \frac{\pi}{2} = \frac{2\pi d \cos(\phi_{90})}{\lambda_0}$$

$$\phi_{90} = \cos^{-1}\left(\frac{\lambda_0}{4d}\right)$$

In example embodiments, $\lambda_0/4$ can be a lower limit on the inter-element distance d 254, because there is no angle of arrival $\phi$ 252 which makes the phase difference $\beta$ equal to $\pi/2$ if the inter-element distance d 254 is less than $\lambda_0/4$.

In accordance with example embodiments, a lower limit of $\lambda_0/2$ for the inter-element distance d 254 is used to reduce coupling between the antennas 201, 202, 203, and 204. Coupling between the antennas can affect the wave form of the signals received by the antenna 201, 202, 203, and 204, and a larger inter-element distance d 254 reduces the amount of coupling between the antennas 201, 202, 203 and 204.

In accordance with example embodiments, the inter-element distance d 254 is less than or equal to the wavelength $\lambda_0$ relative to the operating frequency of the system so that the system configuration is compact.

In accordance with example embodiments, changes to the phase difference $\beta$ which are driven by a change in the operating frequency $\Delta f$ in connection with the centre point of the system bandwidth can be expressed as:

$$|\Delta\beta| = \frac{2\pi d \cos(\varphi_{90})}{c}|\Delta f| = \frac{2\pi d \left(\frac{\lambda_0}{4d}\right)}{c}|\Delta f| = \frac{\pi\lambda_0|\Delta f|}{c}$$

where c is the speed of light in free space. The change to the phase difference $\beta$, therefore, is not correlated to the inter-element distance d 254 for the same change around the center operating frequency.

In accordance with example embodiments, the inter-element distance d 254 is selected such that the target angle $\phi_{90}$ is, itself, close to 90° so that it can benefit from each antenna's inherent 3 dB-beamwidth and receive as much power as possible. In accordance with some example embodiments, an inter-element distance d 254 greater than $0.75\lambda_0$ is selected so that the target angle $\phi_{90}$ is greater than 70°.

In accordance with example embodiments, the antennas 201, 202, 203, and 204 are 6 dBi gain patch antennas. In some example embodiments, a higher inter-element distance d 254 is selected as the receiving antennas 201, 202, 203 and 204 gain increases and the half power beam width decreases, for example with the use of horn antenna or series-fed patch antennas.

In accordance with some example embodiments, the phase difference $\beta$ will vary from $\pi/2$ when the angle of arrival 252 $\phi$ is different from the target angle $\phi_{90}$. This will change the signal waves $\Psi_1$, $\Psi_2$, $\Psi_3$, and $\Psi_4$ at power coupler outputs 221, 222, 223, and 224, which in turn will change the output voltage at I output 314 and Q output 316.

In accordance with some example embodiments, signal demodulator 300 is able to demodulate the RF modulated signal 151 when the phase difference $\beta$ is approximately equal to $\pi/2$ or 90°. Approximately means the difference is within 20% of the desired phase difference.

In accordance with example embodiments, the spatial interferometry based receiver 110 is able to demodulate RF modulated signals 151 where the difference between the angle of arrival $\phi$ 252 of the RF modulated signal 151 and the target angle $\pi_{90}$ does not exceed 11 degrees. When the difference between the angle of arrival $\phi$ 252 of the RF modulated signal 151 and the target angle $\phi_{90}$ exceeds a predetermined threshold (for example 11 degrees), the impact on the phase difference $\beta$ can cause the demodulation to fail.

Accordingly, in at least some example embodiments, the antennas 201, 202, 203, 204 of receiver circuit 200 are positioned relative to the transmitter 150 so that the angle of arrival $\phi$ 252 of the RF modulated signal 151 and the target angle $\phi_{90}$ does not exceed 11 degrees.

Figure 6:
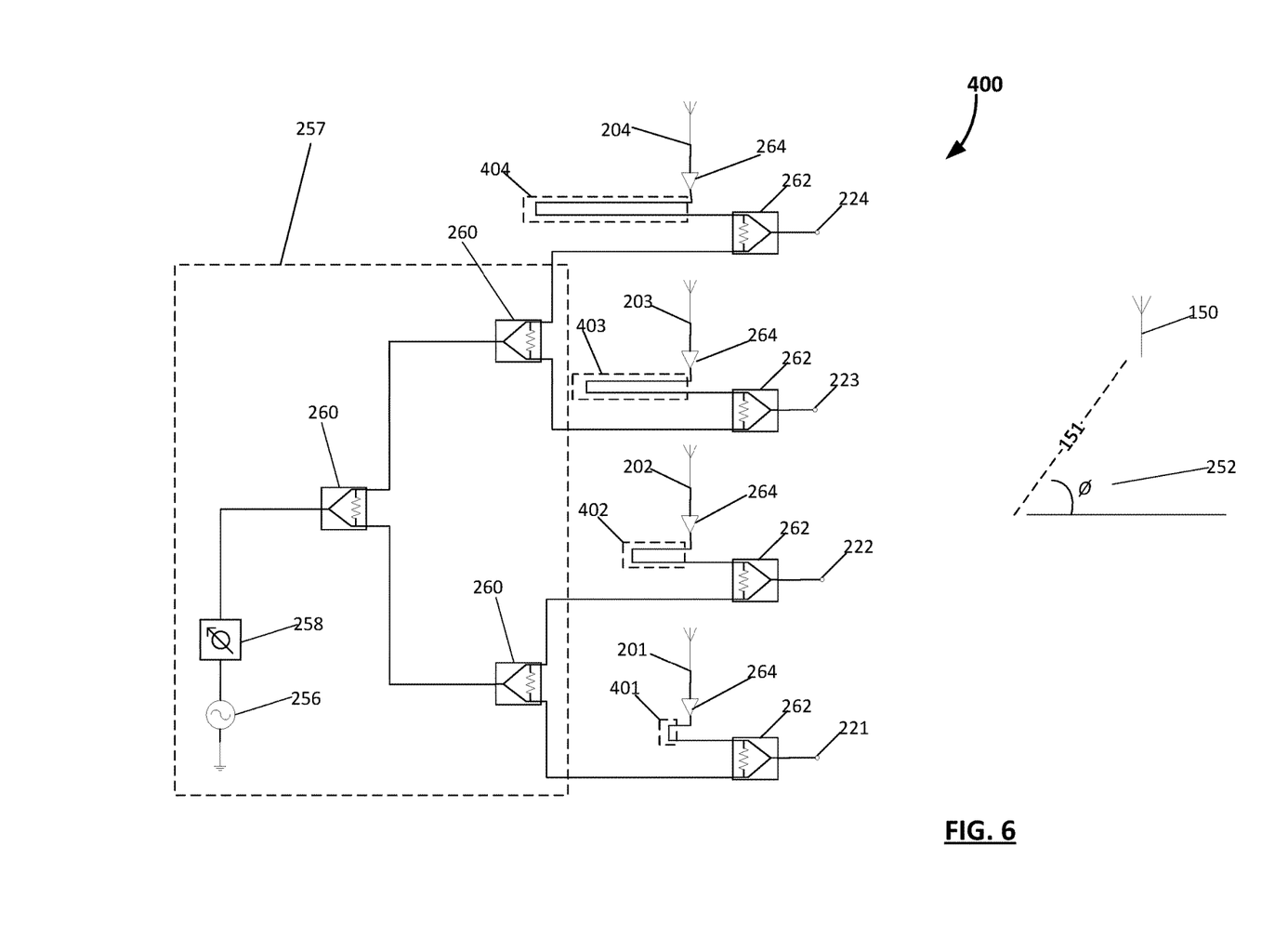
FIG. 6 is a schematic of an alternative spatial interferometry based receiver circuit in accordance with example embodiments.

In at least some alternative embodiments, the receiver circuit 200 of FIG. 2 is modified to reduce the narrow alignment tolerance between the transmitter 150 and the receiver antennas. In this regard, FIG. 6 shows a modified receiver circuit 400 that can function when the transmitter 150 is at any angle within the horizontal plane. The receiver circuit 400 is modified from receiver circuit 200 in that receiver circuit 400 includes a delay line 401, 402, 403, 404 for the RF signal from each antenna 201, 202, 203, 204, respectively. The four antennas 201, 202, 203 and 204 of the alternate receiver 400 receive the same wave front when the antenna of the transmitter 150 is at any angle within the horizontal plane. The four delay lines 401, 402, 403 and 404 are located between the four antennas 201, 202, 203, and 204 and their respective power couplers 262 and are designed to create the desired $\pi/2$ phase difference $\beta$ between the four versions of the signals that are received by the power couplers 262. In the receiver circuit 400, the inter-antenna spacing need not be consistent between all the antennas.

Figure 7:
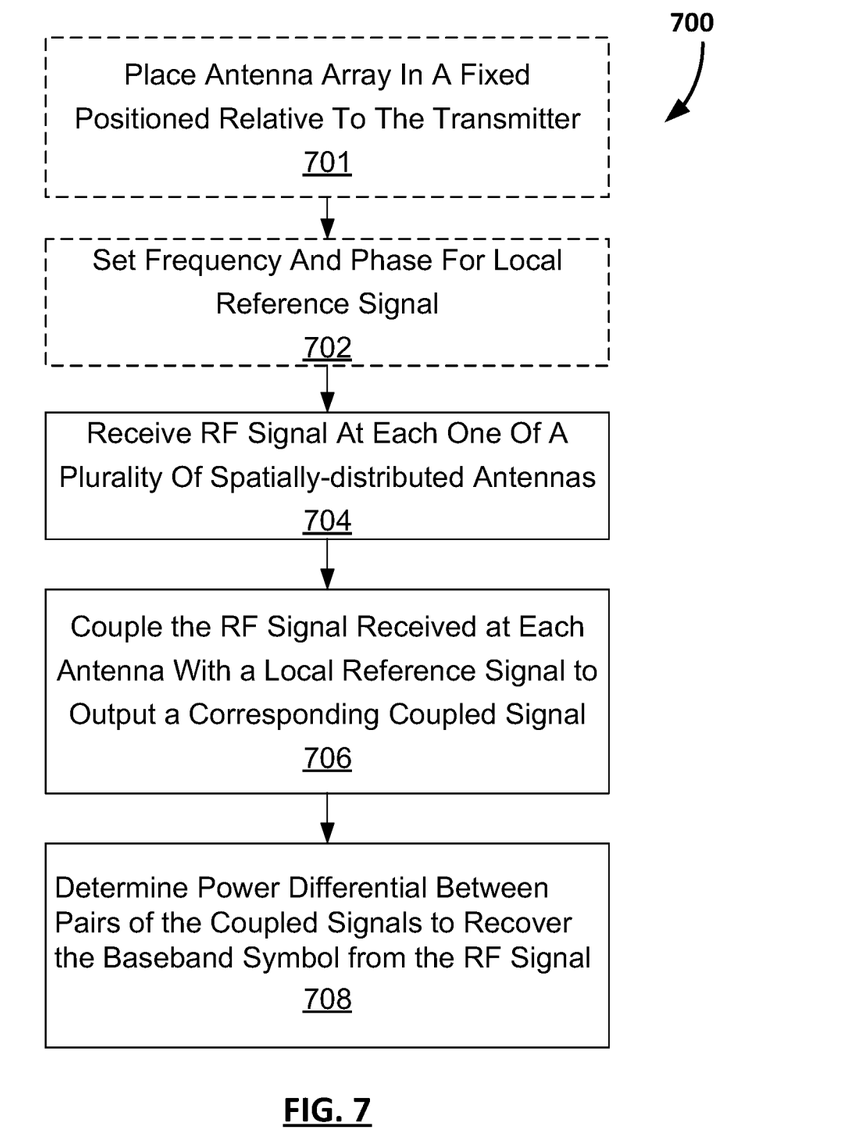
FIG. 7 shows a method of configuring and operating a spatially-distributed multi-input interferometry based receiver according to example embodiments.

An example method 700 of configuring and operating the spatially-distributed multi-input interferometry based receiver 110 is illustrated in FIG. 7 and will be described with reference to the receiver circuit 200 of FIG. 2 and power differentiator circuit 300 of FIG. 3. Configuration actions are shown in dashed-line blocks and operating actions are shown in solid-line blocks in FIG. 7. In the illustrated example, receiver 110 is configured for use in a fixed wireless environment to receive radio frequency (RF) signal 151 that comprises a carrier signal modulated with a baseband symbol.

As shown in block 701, during configuration the linear antenna array 210 of receiver circuit 200 is placed in a fixed positioned relative to the transmitter 150. In example embodiments, the fixed position is selected such that the RF signal 151 will be received within plus or minus 11° of a target angle $\phi_{90}$ for which a phase difference between the versions of the RF signal from any two adjacent antennas is 90°.

As shown in block 702, as part of the receiver configuration, the frequency of local oscillator 256 and phase shift applied by phase shifter 258 are set to produce the required local reference signal $S_{LO}$. In example embodiments, this may involve sending test signals from the transmitter 150 and tuning the local oscillator 256 and phase shifter 258 so that the local reference signal has a frequency and a phase that match the operating frequency and phase of an unmodulated carrier signal transmitted by the transmitter 150.

As shown in block 704, during operation of the receiver 110, an RF signal transmitted by the transmitter 150 is received simultaneously at each one of a plurality of spatially-distributed antennas. In example embodiments, the RF signal is received at each of first, second, third and fourth antennas 201, 202, 203, 204.

As shown in block 706, the RF signal received at each of the plurality of antennas is coupled with the local reference signal $S_{Lo}$ to output a corresponding coupled signal. In particular, in example embodiments coupling the RF signal received at each of the plurality of antennas includes: coupling, using a first coupler 262, a first phased version $A_1$ of the RF signal from the first antenna 201 with the local reference signal $S_{Lo}$ to output a first coupled signal $\psi_1$; coupling, using a second coupler 262, a second phased version $A_2$ of the RF signal from the second antenna 202 with the local reference signal $S_{Lo}$ to output a second coupled signal $\psi_2$; coupling, using a third coupler 262, a third phased version $A_3$ of the RF signal from the third antenna 203 with the local reference signal $S_{Lo}$ to output a third coupled signal $\psi_3$; and coupling, using a fourth coupler 262, a fourth phased version $A_4$ of the RF signal from the fourth antenna 204 with the local reference signal $S_{Lo}$ to output a fourth coupled signal $\psi_4$.

As indicated at block 708, a power differential is determined between at least one pair of the coupled signals to recover the baseband symbol from the RF signal. In particular, in example embodiments, determining a power differential between at least one pair of the coupled signals comprises determining, using power differentiator circuit 300, a first power differential between the first and third coupled signals $\psi_1, \psi_3$ that represents an in-phase component I of the baseband symbol and a second power differential between the second and fourth coupled signals $\psi_2, \psi_4$ that represents a quadrature component Q of the baseband symbol.

In example embodiments, determining the first power differential between the first and third coupled signals comprises: outputting from first power detector 301 a first voltage signal $V_1$ representing a power of the first coupled signal $\psi_1$, and outputting from third power detector 303 a third voltage signal $V_3$ representing a power of the third coupled signal $\psi_3$, the first power differential being a difference between the first voltage signal $V_1$ and the second voltage signal $V_3$. Similarly, determining the second power differential between the second and fourth coupled signals comprises: outputting from second power detector 302 a second voltage signal $V_2$ representing a power of the second coupled signal $\psi_2$, and outputting from fourth power detector 304 a fourth voltage signal $V_4$ representing a power of the fourth coupled signal $\psi_4$, the second power differential being a difference between the second voltage signal $V_2$ and the fourth voltage signal $V_4$.

In example embodiments, the local reference signal $S_{Lo}$ is generated by dividing a generated reference signal, using power divider 260 into two local reference signals $S_{Lo}$ that are then each divided, using two power dividers 260, into two further local reference signals $S_{Lo}$ that are all coupled in simultaneous phase with a respective one of the phased versions $A_1, A_2, A_3, A_4$ of the RF signal.

In example embodiments where receiver circuit 400 is used in place of receiver circuit 200, in configuration block 701 it is not necessary to locate the antenna array such that the RF signal 151 will be received within plus or minus 11° of a target angle ϕ 252. Instead, delay lines 102, 402, 403 and 401 are configured to, respectively, apply a first delay to the RF signal from the first antenna to produce the first phased version of the RF signal for coupling with the local reference signal, apply a second delay to the RF signal from the second antenna to produce the second phased version of the RF signal for coupling with the local reference signal, apply a third delay to the RF signal from the third antenna to produce the third phased version of the RF signal for coupling with the local reference signal, and apply a fourth delay to the RF signal from the fourth antenna to produce the fourth phased version of the RF signal for coupling with the local reference signal. The delays are applied so that the second phased version of the RF signal has a phase difference of approximately 90° from the first phased version of the RF signal, the third phased version of the RF signal has a phase difference of approximately 180° from the first phased version of the RF signal, and the fourth phased version of the RF signal has a phase difference of approximately 270° from the first phased version of the RF signal.

Certain adaptations and modifications of the described embodiments can be made. Therefore, the above discussed embodiments are considered to be illustrative and not restrictive.

What is claimed is:

1. A receiver for receiving a radio frequency (RF) signal that comprises a carrier signal modulated with a baseband symbol, the receiver comprising:
   a plurality of spatially-distributed antennas to receive the RF signal;
   a local reference signal generator configured to generate a local reference signal;
   a plurality of power couplers, each power coupler having a first input connected to a respective one of the antennas to receive a respective version of the RF signal, a second input connected to the local reference signal generator to receive the local reference signal, and an output to output a corresponding coupled signal; and
   a differentiator circuit connected to the power coupler outputs for determining a power differential between at least one pair of the coupled signals to recover the baseband symbol from the RF signal.

2. The receiver of claim 1 wherein:
   the plurality of spatially-distributed antennas includes a first, second, third and fourth antenna,
   the plurality of power couplers includes:
   a first power coupler having the first input thereof connected to the first antenna to receive a first phased version of the RF signal and the second input thereof connected to the local reference signal generator to receive the local reference signal, the output of the first power coupler outputting a first coupled signal;
   a second power coupler having the first input thereof connected to the second antenna to receive a second phased version of the RF signal and the second input thereof connected to the local reference signal generator to receive the local reference signal, the output of the second power coupler outputting a second coupled signal;
   a third power coupler having the first input thereof connected to the third antenna to receive a third phased version of the RF signal and the second input thereof connected to the local reference signal generator to receive the local reference signal, the output of the third power coupler outputting a third coupled signal; and
   a fourth power coupler having the first input thereof connected to the fourth antenna to receive a fourth phased version of the RF signal and the second input thereof connected to the local reference signal generator to receive the local reference signal, the output of the fourth power coupler outputting a fourth coupled signal;

wherein the differentiator circuit is configured to determine a first power differential between the first and third coupled signals that represents an in-phase component of the baseband symbol and a second power differential between the second and fourth coupled signals that represents a quadrature component of the baseband symbol.

3. The receiver of claim 2 wherein the local reference signal generator is configured to generate the local reference signal to have a frequency and a phase that matches an operating frequency and a phase of the carrier signal.

4. The receiver of claim 3 wherein the local reference signal generator comprises a local oscillator that generates a base reference signal to match an operating frequency of the carrier signal, and a phase shifter that adjusts a phase of the base reference signal to match the unmodulated phase of the carrier signal.

5. The receiver of claim 4 wherein the local reference signal generator comprises a first power divider at an output of the phase shifter to output two copies of the local reference signal, and a second and third power divider each connected to the first power divider to receive a respective one of the two copies of the local reference signal, the second and third power dividers each providing copies of the local reference signal to the second inputs of a respective two of the power couplers such that each of the power couplers simultaneously receives the local reference signal.

6. The receiver of claim 3 wherein the second phased version of the RF signal has a phase difference of approximately 90° from the first phased version of the RF signal, the third phased version of the RF signal has a phase difference of approximately 180° from the first phased version of the RF signal, and the fourth phased version of the RF signal has a phase difference of approximately 270° from the first phased version of the RF signal.

7. The receiver of claim 6 wherein the antennas are arranged in a linear array with a constant inter-antenna distance between adjacent antennas that is equal to or greater than one quarter of an operating frequency wavelength of the carrier signal.

8. The receiver of claim 7 wherein the antennas are in a fixed positioned relative to the transmitter such that the RF signal is received within plus or minus 11° of a target angle for which a phase difference between the versions of the RF signal from any two adjacent antennas is 90°.

9. The receiver of claim 8 wherein the target angle is equal to:

$$\cos^{-1}\left(\frac{\lambda_0}{4d}\right),$$

where $\lambda_0$ is the operating frequency wavelength of the carrier signal;
and d is the inter-antenna distance.

10. The receiver of claim 2 comprising:
a first delay line between the first input of the first power coupler and the first antenna, a second delay line between the first input of the second power coupler and the second antenna, a third delay line between the first input of the third power coupler and the third antenna, and a fourth delay line between the first input of the fourth power coupler and the fourth antenna, the delay lines being configured so that the second phased version of the RF signal has a phase difference of approximately 90° from the first phased version of the RF signal, the third phased version of the RF signal has a phase difference of approximately 180° from the first phased version of the RF signal, and the fourth phased version of the RF signal has a phase difference of approximately 270° from the first phased version of the RF signal.

11. The receiver of claim 2 wherein the differentiator circuit comprises:
a first power detector connected to the first power coupler to receive the first coupled signal and output a first voltage signal representing a power of the first coupled signal;
a second power detector connected to the second power coupler to receive the second coupled signal and output a second voltage signal representing a power of the second coupled signal;
a third power detector connected to the third power coupler to receive the third coupled signal and output a third voltage signal representing a power of the third coupled signal;
a fourth power detector connected to the fourth power coupler to receive the fourth coupled signal and output a fourth voltage signal representing a power of the fourth coupled signal;
a first differential op-amp having first and second inputs connected to the first and third power detectors to receive the first and third voltage signals, respectively, and output a voltage representing the first power differential; and
a second differential op-amp having first and second inputs connected to the second and fourth power detectors to receive the second and fourth voltage signals, respectively, and output a voltage representing the second power differential.

12. The receiver of claim 11 comprising respective sample and hold circuits at outputs of the first differential op-amp and the second differential op-amp for sampling the voltages output thereby, the sample and hold circuits each operating at a sampling rate that is approximately double a symbol rate used to modulate the baseband symbols at the transmitter.

13. A method at a receiver for receiving a radio frequency (RF) signal that comprises a carrier signal modulated with a baseband symbol, comprising:
receiving the RF signal simultaneously at each one of a plurality of spatially-distributed antennas;
coupling the RF signal received at each of the plurality of antennas with a local reference signal to output a corresponding coupled signal; and
determining a power differential between at least one pair of the coupled signals to recover the baseband symbol from the RF signal.

14. The method of claim 13 wherein:
receiving the RF signal simultaneously at each one of a plurality of spatially-distributed antennas comprises receiving the RF signal at each of a first, second, third and fourth antenna, and
coupling the RF signal received at each of the plurality of antennas includes:
coupling a first phased version of the RF signal from the first antenna with the local reference signal to output a first coupled signal;

coupling a second phased version of the RF signal from the second antenna with the local reference signal to output a second coupled signal;

coupling a third phased version of the RF signal from the third antenna with the local reference signal to output a third coupled signal; and coupling a fourth phased version of the RF signal from the fourth antenna with the local reference signal to output a fourth coupled signal, and determining a power differential between at least one pair of the coupled signals comprises determining a first power differential between the first and third coupled signals that represents an in-phase component of the baseband symbol and a second power differential between the second and fourth coupled signals that represents a quadrature component of the baseband symbol.

15. The method of claim 14 comprising generating the local reference signal with a frequency and a phase that matches an operating frequency and a phase of the carrier signal.

16. The method of claim 15 wherein generating the local reference signal comprises dividing a generated reference signal into two local reference signals that are then each divided into two further local reference signals that are each coupled in simultaneous phase with a respective one of the phased versions of the RF signal.

17. The method of claim 14 wherein the second phased version of the RF signal has a phase difference of approximately 90° from the first phased version of the RF signal, the third phased version of the RF signal has a phase difference of approximately 180° from the first phased version of the RF signal, and the fourth phased version of the RF signal has a phase difference of approximately 270° from the first phased version of the RF signal.

18. The method of claim 17 comprising a step of locating the antennas in a fixed positioned relative to the transmitter such that the RF signal is received within plus or minus 11° of a target angle for which a phase difference between the versions of the RF signal from any two adjacent antennas is 90°.

19. The method of claim 14 comprising, prior to coupling the RF signal received at each of the plurality of antennas with the local reference signal:

applying a first delay to the RF signal from the first antenna to produce the first phased version of the RF signal for coupling with the local reference signal, applying a second delay to the RF signal from the second antenna to produce the second phased version of the RF signal for coupling with the local reference signal, applying a third delay to the RF signal from the third antenna to produce the third phased version of the RF signal for coupling with the local reference signal, applying a fourth delay to the RF signal from the fourth antenna to produce the fourth phased version of the RF signal for coupling with the local reference signal, the delays being applied so that the second phased version of the RF signal has a phase difference of approximately 90° from the first phased version of the RF signal, the third phased version of the RF signal has a phase difference of approximately 180° from the first phased version of the RF signal, and the fourth phased version of the RF signal has a phase difference of approximately 270° from the first phased version of the RF signal.

20. The method of claim 14 wherein:

determining the first power differential between the first and third coupled signals comprises:

outputting from a first power detector a first voltage signal representing a power of the first coupled signal; and outputting from a third power detector a third voltage signal representing a power of the third coupled signal;

the first power differential being a difference between the first voltage signal and the second voltage signal, and determining the second power differential between the second and fourth coupled signals comprises:

outputting from a second power detector a second voltage signal representing a power of the second coupled signal; and outputting from a fourth power detector a fourth voltage signal representing a power of the fourth coupled signal;

the second power differential being a difference between the second voltage signal and the fourth voltage signal.

* * * * *